(12) United States Patent
Gerwig et al.

(10) Patent No.: US 12,379,703 B2
(45) Date of Patent: *Aug. 5, 2025

(54) AUTOMATION FIELD DEVICE WITH AUXILIARY CURRENT INPUT

(71) Applicant: Endress+Hauser SE+Co. KG, Maulburg (DE)

(72) Inventors: Simon Gerwig, Schopfheim (DE); Christian Strittmatter, Rickenbach (DE); Bernd Strütt, Steinen (DE)

(73) Assignee: Endress+Hauser SE+Co. KG, Maulburg (DE)

(*) Notice: Subject to any disclaimer, the term of this patent is extended or adjusted under 35 U.S.C. 154(b) by 373 days.

This patent is subject to a terminal disclaimer.

(21) Appl. No.: 17/996,961

(22) PCT Filed: Apr. 19, 2021

(86) PCT No.: PCT/EP2021/060030
§ 371 (c)(1),
(2) Date: Oct. 24, 2022

(87) PCT Pub. No.: WO2021/213958
PCT Pub. Date: Oct. 28, 2021

(65) Prior Publication Data
US 2023/0168655 A1 Jun. 1, 2023

(30) Foreign Application Priority Data
Apr. 23, 2020 (DE) ................... 10 2020 111 125.8

(51) Int. Cl.
*G05B 19/05* (2006.01)

(52) U.S. Cl.
CPC .... *G05B 19/05* (2013.01); *G05B 2219/13015* (2013.01)

(58) Field of Classification Search
CPC ................ G05B 19/05; G05B 2219/13015
(Continued)

(56) References Cited

U.S. PATENT DOCUMENTS 9,601,943 B2 * 3/2017 Partovi ................ H02J 7/00
10,248,601 B2 * 4/2019 McLaughlin ....... G06F 13/4027
(Continued)

FOREIGN PATENT DOCUMENTS

CN 1337081 A 2/2002
CN 101485074 A 7/2009
(Continued)

OTHER PUBLICATIONS

Mojtaba, et al. "Step-Up Dc-Dc converters: A Com . . . ", IEEE Pow Electronics, V.32, #12, Dec. 2017 (Year: 2017).*

*Primary Examiner* — Md Azad
(74) *Attorney, Agent, or Firm* — Mark A. Logan; Endress+Hauser (USA) Holding, Inc.

(57) ABSTRACT

An automation field device comprises a first, a second, and a third connection pin; and a field device electronics designed to be operated either in a two-conductor mode or in a three-conductor mode. The field device electronics have an energy supply unit designed to provide internal energy supply exclusively by means of the fed current in the two-conductor mode. In the three-conductor mode, an additional auxiliary current is to be fed to the field device electronics via an additional single-wire line connected to the third connection pin, and the energy supply unit is also designed to provide the internal energy supply via the fed current and the fed additional auxiliary current. Furthermore, the field device electronics are designed to use the additionally fed auxiliary current for internal energy supply only if the current fed by means of the two-wire line is not sufficient for the internal energy supply.

9 Claims, 2 Drawing Sheets

(58) Field of Classification Search
USPC ............................................................ 700/28
See application file for complete search history.

(56) References Cited

U.S. PATENT DOCUMENTS

| | | | |
|---|---|---|---|
| 2005/0073789 A1* | 4/2005 | Tanis | H01H 9/547 |
| | | | 361/100 |
| 2008/0013226 A1* | 1/2008 | Kirst | H02H 9/008 |
| | | | 361/18 |
| 2009/0219084 A1* | 9/2009 | Michalski | G06F 1/3203 |
| | | | 327/544 |
| 2016/0226162 A1 | 8/2016 | Erni | |
| 2016/0299175 A1 | 10/2016 | Dewey et al. | |

FOREIGN PATENT DOCUMENTS

| | | |
|---|---|---|
| CN | 108027598 A1 | 5/2018 |
| DE | 102016101078 A1 | 8/2016 |
| DE | 102016106457 A1 | 10/2016 |
| DE | 102018120108 A1 | 2/2020 |
| EP | 3093720 B1 | 1/2020 |

* cited by examiner

AUTOMATION FIELD DEVICE WITH AUXILIARY CURRENT INPUT

CROSS-REFERENCE TO RELATED APPLICATIONS

The present application is related to and claims the priority benefit of DPMA Patent Application No. 10 2020 111 125.8, filed on Apr. 23, 2020, and International Patent Application No. PCT/EP2021/060030, filed on Apr. 19, 2021, the entire contents of which are incorporated herein by reference.

TECHNICAL FIELD

The invention relates to an automation field device and to an automation system.

BACKGROUND

In automation, field devices serving to record and/or modify process variables are frequently used, particularly in process automation. Sensors, such as fill-level measuring devices, flow meters, pressure and temperature measuring devices, pH redox potential meters, conductivity meters etc., are used for recording the respective process variables, such as fill level, flow, pressure, temperature, pH level, and conductivity. Actuators, such as, for example, valves or pumps, are used to influence process variables. The flow rate of a fluid in a pipeline section or a fill level in a container can thus be altered by means of actuators. In principle, all devices that are used in-process and that supply or process process-relevant information are referred to as field devices. In the context of the invention, field devices also include remote I/Os, radio adapters, and/or, in general, devices that are arranged on the field level.

A variety of such field devices is manufactured and marketed by the Endress+Hauser company.

For historical reasons, these are typically connected via a two-wire line, i.e. a line with two separately formed wires, to a higher-level unit, for example a PLC control unit or a control system. Two-wire field devices are designed here in such a way that measurement or control values as a process variable are communicated, i.e. transmitted, in analog form via the two-wire line as a 4-20 mA loop current or current signal. In this case, a loop current of the two-wire line is set to a specific value according to the captured process variable by the field device or the higher-level unit. The measuring range is represented linearly on the 4-20 mA current signal.

Furthermore, the field devices are also supplied with energy via the two-wire line. In this case, they can also be referred to as two-wire field devices. Usually, a supply voltage of between 10-35 V is applied in two-wire field devices. In the case of a fault current of ≤3.6 mA and a minimum input voltage of, for example, 10 V, a maximum possible supply power of ≤36 mW is thus available to the two-wire field device.

Alternatively, in the event that more energy is required than can be provided to the field device via the two-wire line, the field devices can also be connected via a three-wire line. This eliminates the need to limit the supply of supply power, as is the case with the two-wire line.

In order to be able to implement the different modes of operation (two-wire or three-wire operation), there are different field device electronics which are integrated into the field device during manufacture of the field device. This means that the field device manufacturers must provide different field device electronics or variances depending on the desired operation.

SUMMARY

An object of the invention is therefore to provide a possibility of reducing manufacturing variances.

The automation field device according to the invention at least comprises:
- at least a first, a second and a third connection pin for connecting internal field device electronics to an external voltage source;
- the field device electronics, which are designed such that they can be operated either in a two-conductor mode or in a three-conductor mode, wherein a current is to be fed to the field device electronics in the two-conductor mode via a two-wire line to be connected to the first and second connection pins, and the field device electronics have a first data and/or energy supply path, which leads the current internally from the first to the second connection pin, wherein the field device electronics have an energy supply unit, which is designed to provide an internal energy supply exclusively by means of the fed current in the two-conductor mode, wherein the field device electronics are to be fed an additional auxiliary current in the three-conductor mode by means of an additional single-wire line to be connected to the third connection pin and the field device electronics have a second energy supply path, which leads the additional auxiliary current internally from the first to the third connection pin, wherein the energy supply unit is also designed to provide the internal energy supply by means of the fed current and the fed additional auxiliary current, wherein the field device electronics are also designed to use the additionally fed auxiliary current for the internal energy supply only if the current fed by means of the two-wire line is not sufficient for the internal energy supply.

According to the invention, a field device is proposed which can be operated both in a two-wire and in a three-wire mode. This is made possible by means of field device electronics which are formed internally and integrally in the field device and which, depending on the desired operation, can be contacted by three outwards-routed connection pins either only with a two-wire line or, if necessary, additionally with a single-wire line. As a result of the field device electronics being integrally formed as a combination two-wire and three-wire circuit, a variance of the field device electronics can be reduced, since only one set of field device electronics is required for both operating modes.

In an advantageous embodiment of the field device according to the invention, the field device electronics further have a first and a second diode, wherein the first diode is integrated in the first data and/or energy supply path in such a way that a cathode of the first diode is directed to the electronics supply unit and wherein the second diode is integrated in the second energy supply path in such a way that a cathode of the second diode is likewise directed to the electronics supply unit, such that, in the case of a voltage applied to the cathode of the first diode falling below a specific voltage value, the second diode will be switched to the conductive state.

In another advantageous embodiment of the field device according to the invention, the field device electronics further comprise a galvanic isolator, which is integrated in the second energy supply path and which is designed to provide a potential-free output voltage downstream of the galvanic isolator, and wherein the field device electronics are further designed to feed the potential-free output voltage to the electronics supply unit. In particular, in this embodiment, the field device electronics may further comprise a chopper, which is integrated in the second energy supply path and which serves to convert a DC voltage applied on the input side into a rectangular AC voltage applied on the output side, and the field device electronics are further designed to feed the output-side AC voltage to the galvanic isolator. In particular, in this embodiment, the field device electronics may further comprise a voltage regulator, which is connected upstream of the chopper and is designed to regulate a voltage applied via the first and third connection pins.

In another advantageous embodiment of the field device according to the invention, the field device electronics further comprise a 4-20 mA current regulation unit and are designed in such a way that at least some of the current is led via the 4-20 mA current regulation unit, wherein the 4-20 mA current regulation unit is configured to set the current according to a 4-20 mA standard both in the two-wire mode and in the three-wire mode.

The invention further relates to an automation system, at least comprising:
- an automation field device according to any one of the preceding claims;
- a voltage source arranged outside the field device;
- a two-wire line, which connects a positive pole of the voltage source to the first connection pin by means of a first wire and which connects a negative pole of the voltage source to the second connection pin by means of a second wire.

In an advantageous embodiment of the system according to the invention, an external load resistor is integrated in the connection of the negative pole of the voltage source to the second connection pin.

Another advantageous embodiment of the system according to the invention further comprises a single-wire line which connects the negative pole of the voltage source to the third connection pin.

BRIEF DESCRIPTION OF THE DRAWINGS

The invention is explained in more detail on the basis of the following drawings, in which.

DETAILED DESCRIPTION

Figure 1:
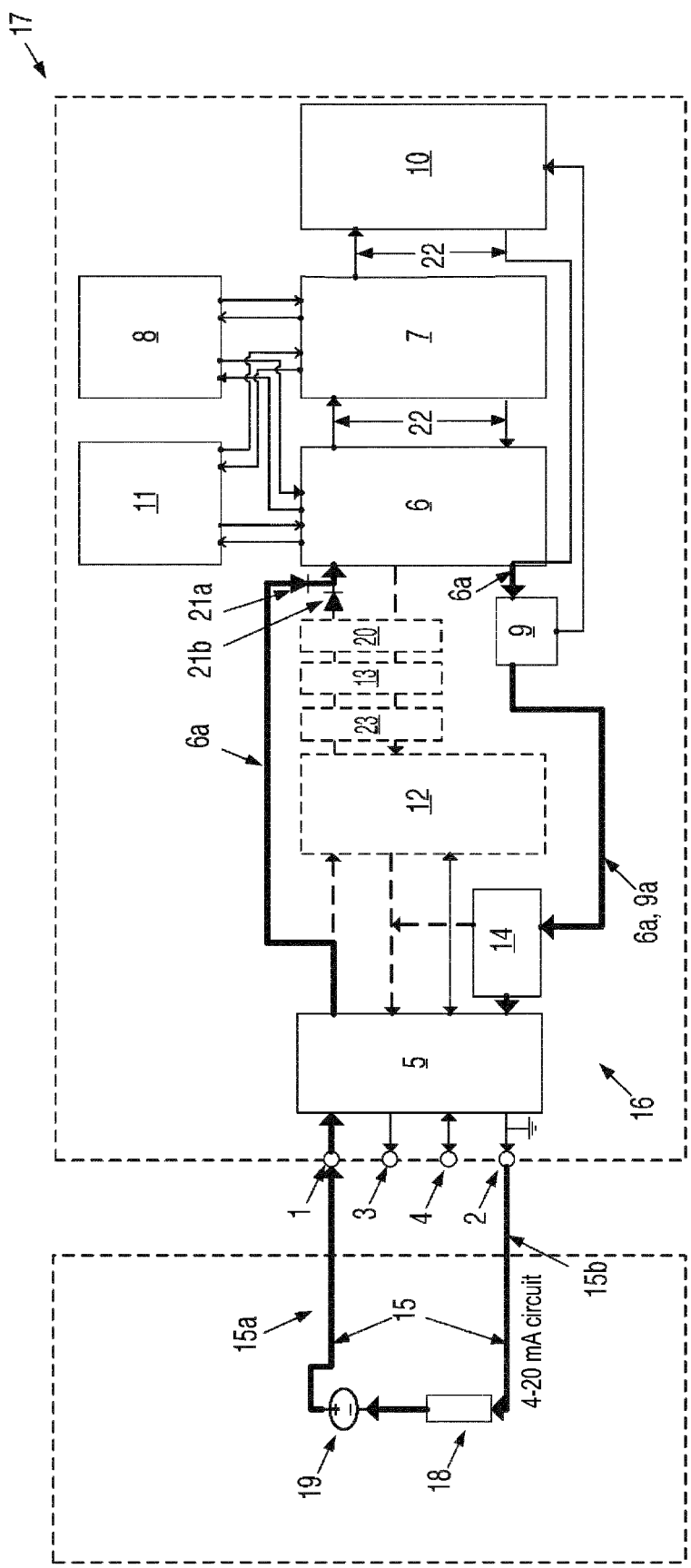
FIG. 1 shows a field device with field device electronics which are connected to a voltage source by means of a two-wire line via two connection pins.
Figure 2:
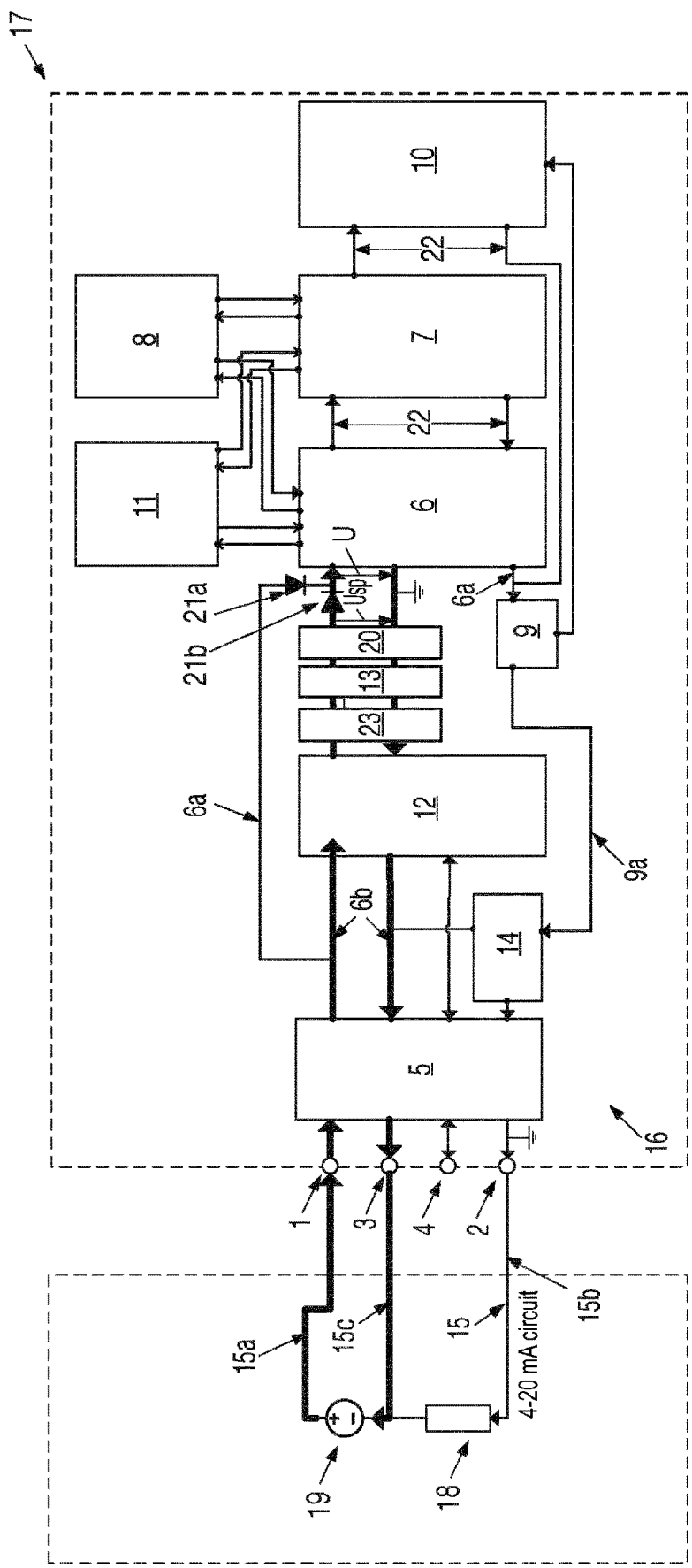
FIG. 2 shows the field device with the field device electronics, which are connected to a voltage source by means of a three-wire line via three connection pins.

The automation field device 17 shown in FIGS. 1 and 2 comprises integrally formed internal field device electronics 16 via which connection either to a two-wire or a three-wire line is possible. The field device electronics 16 are therefore designed such that the field device 17, can be operated either as a two-conductor or three-conductor field device depending on the circumstances or installation situation in an automation system.

For connecting the field device 17, the field device electronics 16 have at least three connection pins 1, 2, 3, via which either the two-wire or three-wire line can be connected. In the exemplary embodiment shown in FIG. 1, the field device has four connection pins 1, 2, 3, 4, by way of example. Furthermore, the field device electronics comprise an electromagnetic compatibility (EMC) filter 5, which is connected downstream of the connection pins 1, 2, 3, 4 in order to protect the field device 17 from possible EMC interference, an electronics supply unit 6 for the internal energy supply, a microprocessor 7 for internally controlling the field device electronics 16, a sensor element or actuator element 8 for capturing or setting a measurement or control value, a shunt resistor 9, and a 4-20 mA current regulation unit 10 which, together with the shunt resistor 9, sets or modulates a 4-20 mA current signal.

In addition, the field device electronics system 16 may comprise a display and/or input unit 11, for example in the form of a touch display. By means of the display and/or input unit 11, measurement or control values can be displayed, for example, or the field device 17 can be parametrized.

The integrally formed field device electronics 16 according to the invention can be operated in different operating states. On the one hand, the field device electronics 16 can be configured to be operated in the two-conductor mode and, in addition, they can also be configured or have been configured to be operated in a three-conductor mode.

FIG. 1 shows, by way of example, a two-conductor mode in which the field device electronics 16 are connected via a two-wire line 15 to an external voltage source 19 and to an external load resistor 18 connected in series to the voltage source 19. In the two-conductor mode, the field device electronics 16 are connected to the voltage source 19 located outside the field device via a first connection pin 1 and a second connection pin 2 in order to feed a current. In the two-conductor mode, the 4-20 mA current signal for transmitting a measurement or control value is communicated via the fed current and also an internal energy supply for the field device electronics is made possible.

In order to feed the current I fed via the first connection pin 1 to the electronics supply unit 6, the field device electronics have a first data and/or energy supply path 6a (indicated by a thick line in FIG. 1), which connects the first connection pin 1 to the electronics supply unit 6 via the EMC filter 5. The electronics supply unit 6 is configured to provide an internal energy supply by means of the fed current I and to supply with energy the other internal electronic components, such as the display and/or input unit 11, the sensor or actuator element 8, and/or the microprocessor 7. Furthermore, the fed current I or the portions of said current which are not routed via the electronics supply unit to the internal shunt resistor 9 is/are guided along additional connection paths via the current regulation unit 10 and/or the microprocessor 7.

The current regulation unit 10 is configured to set the current in accordance with the 4-20 mA standard. For example, in the case whereby the field device is designed as a sensor, i.e. comprises a sensor element 8, the current via the 4-20 mA current regulation unit 10 together with the shunt resistor 9 can be set in accordance with a process variable captured by the sensor element, in order to be transmitted to a higher-level unit (not shown in FIG. 1). In order to enable the two-conductor mode, a switching unit 14 is provided, which is configured such that the current I coming from the shunt resistor 9 via a 4-20 mA output path 9a is led to the second connection pin 2.

FIG. 2 shows, by way of example, a three-conductor mode in which the field device electronics 16 are connected via an additional single-wire line 15c to a negative pole of the voltage source 19. Here, the single-wire line 15c is connected via a third connection pin 3 of the field device electronics 16. By means of the additional line 15c, energy can additionally be fed to the field device electronics 16 via the first and third connection pins 1, 3.

According to the invention, the field device electronics 16 are designed to provide the additional energy available between the first and the third connection pins 1, 3, depending on the requirements of the other internal electronic components of the field device electronics, if the energy that can be generated by the fed current is not sufficient for the internal energy supply.

Due to the additional connection of the negative pole of the voltage source to the third connection pin by means of the single-wire line, an additional current can be provided to the field device electronics for generating energy. The field device electronics are designed such that the additional current is rectified via a second energy path 6b (indicated in FIG. 2 by a thick line), which serves as a pure energy path and is guided from the first connection pin to the energy supply unit and back to the third connection pin. In order to rectify the additional current, a rectifier 20 is integrated in the second energy path.

However, when the additional single-wire line 15c is connected between the third connection pin 3 and the negative pole of the voltage source 19, since the third connection pin is at a lower voltage or potential than the second terminal pin, which is connected to ground, the field device electronics will also comprise a galvanic isolator 13 integrated in the second energy path, such that an output voltage downstream of the galvanic isolator is ground-free or potential-free and can be fed to the electronics supply unit 6, which is connected to the ground of the field device electronics 16, for the internal energy supply. The difference in voltage or potential between the second and third connection pins can also fluctuate as a function of the external load 18 and/or the current set by the 4-20 mA current regulation unit 10.

Furthermore, the field device electronics comprise a chopper 23, which serves to convert a DC voltage applied on the input side into a rectangular AC voltage applied on the output side, such that output-side AC voltage can subsequently be transformed via the galvanic isolator 13.

The chopper 23, the rectifier 20, and the galvanic isolator 13 can be implemented both as independent electronic components and in a single electronic component.

Optionally, the field device electronics system 16 can also have a voltage regulator 12 which is connected upstream of the chopper 23 and is designed to stabilize a voltage applied via the first and third connection pins 1, 3 such that said voltage can be fed to the electronic supply unit 6 for the energy supply.

In order to be able to use the additional energy as required, i.e. only when the energy obtained from the current fed via the two-wire line or the stabilized voltage U is not sufficient to supply the internal components with sufficient energy, the field device electronics 16 comprise a diode arrangement. The diode arrangement consists of a first diode 21a, which is integrated in the first data and/or energy supply path 6 in such a way that a cathode of the first diode 21a is directed to the electronics supply unit 6 and a second diode 21b, which is integrated in the second energy supply path 6b in such a way that a cathode of the second diode 21b is likewise directed to the electronics supply unit 6, such that, in the case of the stabilized voltage U applied to the cathode of the first diode falling below a specific voltage value $U_{sp}$, the second diode 21b will be switched to the conductive state. The specific voltage value $U_{sp}$ is, in this case, dependent on the design or dimensioning of the field device electronics 16 and is substantially defined by the voltage U stabilized by the voltage regulator 12, wherein the specific voltage value $U_{sp}$ is selected so as to be greater than the stabilized voltage U, i.e. $U_{sp} > U$. Usually, the specific voltage value $U_{sp}$ is greater than the stabilized voltage U by the forward voltage of the second diode. For example, the field device electronics may be dimensioned such that the stabilized voltage U of the voltage regulator provided for the electronics supply unit 6 as operating voltage is approximately 15 V and the specific voltage value is approximately 15.7 V, wherein the second diode has a forward voltage of approximately 0.7 V. This demand-dependent activation offers the advantage that heating of the field device electronics can be reduced during operation with active current output.

Furthermore, the field device electronics may have a fourth connection pin 4, in particular for communication purposes. The field device electronics may be designed, for example, in such a way that digital communication, in particular IO-Link communication, is possible via the fourth connection pin 4.

LIST OF REFERENCE SIGNS

1 First connection pin
2 Second connection pin
3 Third connection pin
4 Fourth connection pin
5 EMC filter
6 Electronics supply unit
6a First data and/or energy supply path
6b Second pure energy supply path
7 Microprocessor
8 Sensor or actuator element
9 Internal shunt resistor
9a 4-20 mA output path
10 4-20 mA current regulation unit
11 Display and/or output unit
12 Voltage regulator
13 Galvanic isolator
14 Switching unit
15 Two-wire line
15a First wire of the two-wire line
15b Second wire of the two-wire line
15c Additional single-wire line
16 Field device electronics
17 Automated field device
18 External load
19 External voltage source
20 Rectifier
21a First diode
21b Second diode 21a
22 Connection paths
23 Chopper
U Stabilized voltage
$U_{sp}$ Specific voltage value

The invention claimed is:

1. An automation field device, comprising:
a first, a second, and a third connection pin for connecting a field device electronics to an external voltage source; and
the field device electronics, which are designed such that they can be operated either in a two-conductor mode or in a three-conductor mode, wherein a current is to be fed to the field device electronics in the two-conductor mode via a two-wire line to be connected to the first and second connection pins, and the field device electronics have a first data and energy supply path, which leads the current internally from the first to the second connection pin, wherein the field device electronics have an energy supply unit, which is designed to provide an internal energy supply exclusively by means of the fed current in the two-conductor mode, wherein the field device electronics are to be fed an additional auxiliary current in the three-conductor mode by means of an additional single-wire line to be connected to the third connection pin and the field device electronics have a second energy supply path, which leads the additional auxiliary current internally from the first to the third connection pin, wherein the energy supply unit is also designed to provide the internal energy supply by means of the fed current and the fed additional auxiliary current, wherein the field device electronics are also designed to use the additionally fed auxiliary current for the internal energy supply only if the current fed by means of the two-wire line is not sufficient for the internal energy supply.

2. The automation field device according to claim 1, wherein the field device electronics further include:
a first diode and a second diode,
wherein the first diode is integrated in the first data and energy supply path such that a cathode of the first diode is directed to the electronics supply unit, and
wherein the second diode is integrated in the second energy supply path such that a cathode of the second diode is directed to the electronics supply unit such that when a voltage applied to the cathode of the first diode falls below a specific voltage value, the second diode will be switched to the conductive state.

3. The automation field device according to claim 2, herein the field device electronics further include a galvanic isolator integrated in the second energy supply path and designed to provide a potential-free output voltage downstream of the galvanic isolator, and
wherein the field device electronics are further designed to feed the potential-free output voltage to the electronics supply unit.

4. The automation field device according to claim 3, wherein the field device electronics further include a chopper integrated in the second energy supply path and which serves to convert a DC voltage applied on an input side of the chopper into a rectangular AC voltage applied on an output side, and
wherein the field device electronics are further designed to feed the output-side AC voltage to the galvanic isolator.

5. The automation field device according to claim 4, wherein the field device electronics further include a voltage regulator connected upstream of the chopper and designed to regulate a voltage applied via the first and third connection pins.

6. The automation field device according to claim 5, wherein the field device electronics further include a 4-20 mA current regulation unit, and
wherein the field device electronics are designed such that at least some of the current is led via the 4-20 mA current regulation unit, and
wherein the 4-20 mA current regulation unit is configured to set the current according to a 4-20 mA standard both in the two-wire mode and in the three-wire mode.

7. An automation system, comprising:
an automation field device, including:
a first, a second, and a third connection pin for connecting a field device electronics to an external voltage source; and
the field device electronics, which are designed such that they can be operated either in a two-conductor mode or in a three-conductor mode, wherein a current is to be fed to the field device electronics in the two-conductor mode via a two-wire line to be connected to the first and second connection pins, and the field device electronics have a first data and energy supply path, which leads the current internally from the first to the second connection pin, wherein the field device electronics have an energy supply unit, which is designed to provide an internal energy supply exclusively by means of the fed current in the two-conductor mode, wherein the field device electronics are to be fed an additional auxiliary current in the three-conductor mode by means of an additional single-wire line to be connected to the third connection pin and the field device electronics have a second energy supply path, which leads the additional auxiliary current internally from the first to the third connection pin, wherein the energy supply unit is also designed to provide the internal energy supply by means of the fed current and the fed additional auxiliary current, wherein the field device electronics are also designed to use the additionally fed auxiliary current for the internal energy supply only if the current fed by means of the two-wire line is not sufficient for the internal energy supply;
a voltage source arranged outside the field device;
a two-wire line that connects a positive pole of the voltage source to the first connection pin via a first wire and which connects a negative pole of the voltage source to the second connection pin via a second wire.

8. The automation system according to claim 7, wherein an external load resistor is integrated in the connection of the negative pole of the voltage source to the second connection pin.

9. The automation system according to claim 8, further comprising:
a single-wire line that connects the negative pole of the voltage source to the third connection pin.

* * * * *